United States Patent
Rylski

(10) Patent No.: US 9,953,187 B2
(45) Date of Patent: Apr. 24, 2018

(54) SYSTEM AND METHOD OF CONTEXTUAL ADJUSTMENT OF VIDEO FIDELITY TO PROTECT PRIVACY

(71) Applicant: Honeywell International Inc., Morristown, NJ (US)

(72) Inventor: Erik Rylski, Ronkonkoma, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 270 days.

(21) Appl. No.: 14/553,158

(22) Filed: Nov. 25, 2014

(65) Prior Publication Data

US 2016/0148016 A1 May 26, 2016

(51) Int. Cl.
| | |
|---|---|
| *G06F 21/62* | (2013.01) |
| *H04N 7/18* | (2006.01) |
| *G06K 9/00* | (2006.01) |
| *G06T 3/00* | (2006.01) |
| *G08B 13/196* | (2006.01) |

(52) U.S. Cl.
CPC ..... *G06F 21/6245* (2013.01); *G06K 9/00288* (2013.01); *G06K 9/00771* (2013.01); *G06T 3/0093* (2013.01); *G08B 13/19686* (2013.01); *H04N 7/18* (2013.01); *H04N 7/181* (2013.01)

(58) Field of Classification Search
CPC ............ G06F 21/6245; G06K 9/00288; G06K 9/00771; G06T 3/0093; G08B 13/19686; H04N 7/18; H04N 7/181
USPC .......................................................... 348/143
See application file for complete search history.

(56) References Cited

U.S. PATENT DOCUMENTS

| | | | |
|---|---|---|---|
| 9,432,639 B2* | 8/2016 | Oh ................... | G08B 13/19613 |
| 2005/0157169 A1* | 7/2005 | Brodsky ............... | G01S 3/7864 |
| | | | 348/143 |
| 2005/0162515 A1* | 7/2005 | Venetianer .......... | G06F 17/3079 |
| | | | 348/143 |
| 2006/0064384 A1* | 3/2006 | Mehrotra .............. | G01S 3/7864 |
| | | | 705/57 |
| 2007/0127787 A1* | 6/2007 | Castleman ......... | G06K 9/00248 |
| | | | 382/118 |
| 2007/0182540 A1* | 8/2007 | Marman ............ | G06K 9/00362 |
| | | | 340/506 |
| 2009/0122159 A1* | 5/2009 | Sakaue .............. | H04N 5/23293 |
| | | | 348/231.99 |
| 2012/0293686 A1* | 11/2012 | Karn ...................... | G11B 27/24 |
| | | | 348/231.3 |

(Continued)

FOREIGN PATENT DOCUMENTS

WO    WO 03/034361 A1    4/2003

OTHER PUBLICATIONS

Extended European search report for corresponding EP patent application 15195223.1, dated Apr. 21, 2016.

*Primary Examiner* — Behrooz Senfi
(74) *Attorney, Agent, or Firm* — Husch Blackwell LLP

(57) ABSTRACT

A method and apparatus are provided that include a security camera of a security system within a residence capturing a sequence of images of a secured area of the residence, a programmed processor of the security system determining that an authorized person is present within the residence, a programmed processor detecting a detected person within the sequence of images, and a programmed processor blurring or reducing a picture quality of an area immediately around the detected person based upon a presence of the authorized person.

17 Claims, 1 Drawing Sheet

(56) References Cited

U.S. PATENT DOCUMENTS

| | | | | |
|---|---|---|---|---|
| 2013/0278422 | A1* | 10/2013 | Friedman | G08B 13/196 340/541 |
| 2014/0139678 | A1* | 5/2014 | Moriarty | G08B 13/19671 348/152 |
| 2014/0347479 | A1* | 11/2014 | Givon | G06K 9/00342 348/143 |
| 2015/0195523 | A1* | 7/2015 | Sato | H04N 19/70 375/240.12 |
| 2015/0278499 | A1* | 10/2015 | Levitov | G06F 21/32 726/19 |

* cited by examiner

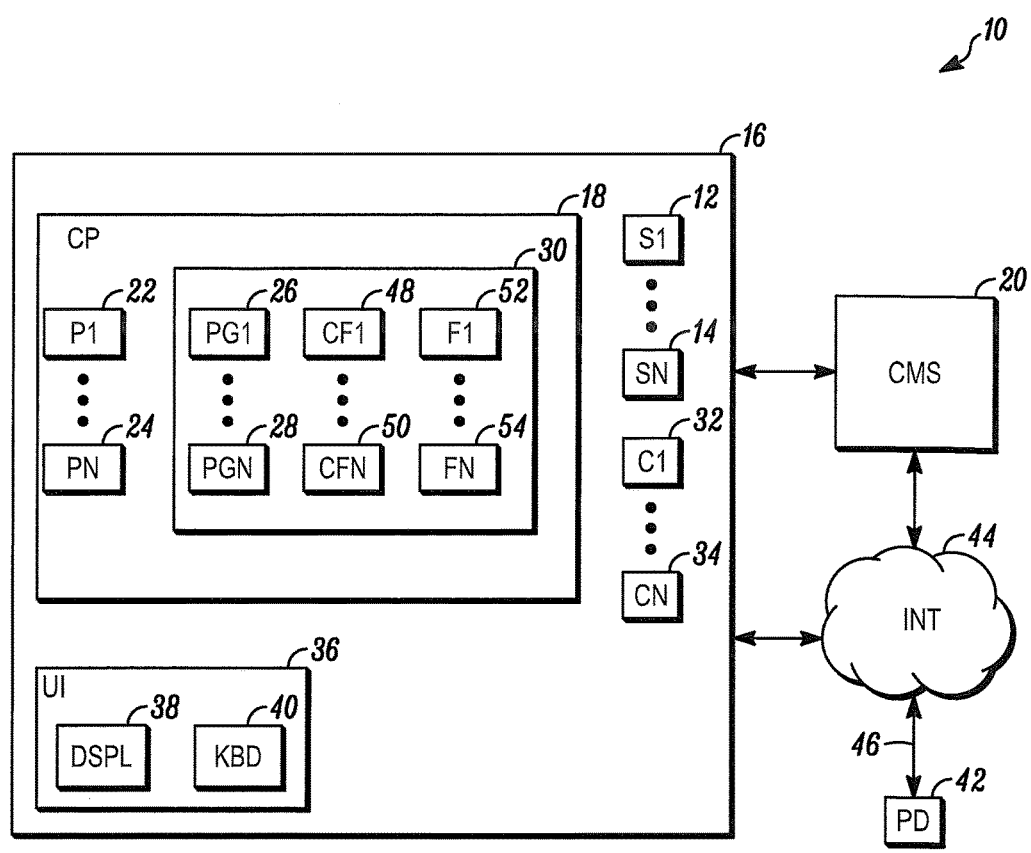

US 9,953,187 B2

SYSTEM AND METHOD OF CONTEXTUAL ADJUSTMENT OF VIDEO FIDELITY TO PROTECT PRIVACY

FIELD

This application relates to security systems and, more particularly, to surveillance systems.

BACKGROUND

Systems are known to protect people and assets within secured areas. Such systems are typically based upon the use of one or more sensors that detect threats within the secured areas.

Threats to people and assets may originate from any of a number of different sources. For example, a fire may kill or injure occupants who become trapped by a fire in a home. Similarly, carbon monoxide from a fire may kill people in their sleep.

Alternatively, an unauthorized intruder, such as a burglar may present a threat to assets within a secured area. Intruders have also been known to injure or kill people living within the area.

In the case of intruders, sensors may be placed and used in different areas based upon the different uses of a secured space. For example, if people are present within some portions of a normal day and not at other times, then some sensors may be placed along a periphery of the space to provide protection while the space is occupied while additional sensors may be placed and used within an interior of the space when the space is not occupied.

In most cases, threat sensors are connected to a local control panel. In the event of a threat detected via one of the sensors, the control panel may sound a local audible alarm. The control panel may also send a signal to a central monitoring station.

While surveillance systems work well, there are often concerns about privacy in the context of a home. This is especially true in the context where personnel at the central monitoring station may have access to video from the home. Accordingly, a need exists for better methods of protecting the privacy of occupants of the home.

BRIEF DESCRIPTION OF THE DRAWINGS

FIG. 1 illustrates a block diagram of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the system are a number of sensors 12, 14 that detect threats within a secured geographic area 16. The sensors may be based upon any of a number of different types of technology. For example, some of the sensors may be limit switches placed on doors and/or windows providing entrance into and egress the secured area. Alternatively, the sensors may include one or more passive infrared (PIR) sensor used to detect intruders who have been able to circumvent the sensors on the doors and windows of the secured area.

The sensors may also include one or more environmental sensors. In this case, the sensors may include any of a number of smoke or carbon monoxide detectors.

Also included within the secured area may be one or more closed circuit television (CCTV) cameras 32, 34. The CCTV cameras may be provided with motion detection capability to detect intruders.

The sensors and cameras may be monitored by a control panel 18. Upon detection of a threat by one of the sensors or cameras, the control panel may compose an alarm message and send it to a central monitoring station 20. The message may include an identifier of the security system (e.g., address, account number, etc.), an identifier or location of the one of the sensors or cameras that detected the threat, and a time that the threat was detected. Where the detection of the threat originates from the one of the cameras, the message may also include one or more video images. The central monitoring station may respond by summoning the appropriate help (e.g., police, fire department, etc.).

Included within the control panel, the sensors, and the cameras may be one or more processor apparatuses (processors) 22, 24 each operating under control of one or more computer programs 26, 28 loaded from a non-transitory computer readable medium (memory) 30. As used herein, reference to a step performed by a computer program is also reference to the processor that executed that step of the program.

The system may be controlled via a user interface 36. The user interface may include a keyboard 40 and a display 38. An authorized person (user) may enter a personal identification number (PIN) and an appropriate function key through the keyboard to arm the system. Similarly, the user may enter his/her PIN and a disarm or armed stay instruction to enter a disarmed or armed stay state of operation of the system. The display may display confirmation of each entered instruction.

While in an armed state, a sequence of video frames from each of the cameras may be saved into a corresponding video file 48, 50. Video may be saved continuously or only upon detection of some predefined event by the security system.

The authorized user may review recorded video by entering a camera identifier and time through the user interface. In response, the video from the selected camera and time may be retrieved from the corresponding file and played on the display of the user interface. The user may also view real-time video through the user interface by entering a camera identifier and a real-time monitoring instruction. Where the cameras have pan, tilt and zoom capabilities, the user may adjust camera parameters to have a better real-time view of remote areas of the secured area.

The system may also include a control link 46 to a portable wireless device 42 of the authorized user through the Internet 44. A connection may be established through the central monitoring station or directly with the control panel. An application executing on a processor within the portable wireless device allows the user to interact with the security system in the same manner as the user would through the user interface.

The authorized user may arm or disarm the system remotely through the portable wireless device or locally through the user interface. In an armed away state or the armed stay state, an alarm processor within the panel monitors the secured area via the cameras and/or sensors for the threats. Upon detection of the threat, the alarm processor may sound a local alarm and send a notification of the detected threat to the central monitoring station and to the portable wireless device.

A monitoring processor within the control panel may also send notifications to the portable wireless device upon the occurrence of certain events. For example, a parent may want to be notified when his/her children return home from school. In this case, before or upon entering the secured area (i.e., his/her home), a child may enter his/her PIN to temporarily disarm the security system. The parent may create a program that causes the monitoring processor to notify the parent whenever the child's PIN number is entered through the user interface.

During normal operation, the authorized user may also view the video in real-time from the cameras through the portable wireless device. The user may do this to confirm that his/her child returned home safely after school or to ensure that the child didn't bring friends home after school.

In general, authorized residential users (e.g., household members) have potentially conflicting needs. They may want to have the video streaming from the cameras within the secured area to portable devices for real-time viewing (and record the video in the corresponding file) in order to ensure proper surveillance, breach alerts in the event of an intruder, better contact with loved ones, and occasional entertainment (e.g., observing pets from remote locations).

On the other hand, the authorized residential users (e.g., children or guests) may not want to lose their privacy (e.g., by being watched and recorded via the security system by other family members). In this regard, parents would want to ensure a harmonious relationship with their children. They would not want their children to despise them for covertly monitoring their activities or otherwise invading their privacy.

These problems may be exacerbated where the images from the cameras are occasionally available to security personnel at the central monitoring station. In this case, the parents (and children) may be concerned that video data showing their private lives will be used in an unauthorized manner.

These concerns are addressed via one or more processors of the control panel and/or cameras that dynamically adjust the amount/fidelity of the video data collected from certain areas of a field of view (FOV) of each of the cameras. This adjustment of the fidelity of at least some of the images is based upon input from the FOV of at least one of the cameras and/or real-time software analysis of camera input and other sources, such as a geofence location of at least some of the users. In this regard, one or more privacy processors provide full video data detail or reduced video data detail to authorized viewers, depending on an automatic assessment of the "social context" of a situation.

The privacy processors may include a first identification processor executing analytics software that identifies moving objects as human or nonhuman. This may be accomplished via a height of one of the moving objects, by a height to width ratio of the one of the moving objects, by appendages of the one of the moving objects, or by any of a number of other methodologies.

The privacy processors may also include one or more face recognition processors that first identify an outline of a moving human and then an outline of a face of the moving human. In this case, the face recognition processor(s) may determine certain features of a detected face and then match those determined features to a corresponding authorized user by matching the determined features to contents of a corresponding facial characteristics file 52, 54 of the corresponding authorized user.

Under one illustrated embodiment, the fidelity of human images is adjusted based upon the simple presence of a predefined responsible person (e.g., the parent) within the secured area. Under this embodiment, so long as the home is empty according to geofence input (i.e., no authorized users are at home), the cameras provide full unrestricted streaming and will record any motion event with full fidelity (even when the security system is disarmed). Thus, the privacy processors will allow the cameras to record pets, intruders, maintenance personnel, nannies, babies, etc.

As soon as a first registered (predefined) user returns home, the privacy processors adjust the fidelity for recording based upon the presence of that person. In this regard, the presence of that person may be detected via a PIN number entered through the user interface or via a transmission from the portable wireless device. In this case, once the first registered user enters the home, a presence processor detects that user's presence, and a fidelity processor decreases video/picture fidelity of the FOV in a local area where a person (identified by video analytics software as an adult or adolescent) is located. This means that the processor of the cameras or control panel blurs the outline of the person in real time, but doesn't blur the rest of a scene of the FOV. This is achieved by locally introducing either a lower resolution around the first registered user or by masking inside of the outline of the first registered user. In this way, all incidences of motion/presence of people are still recorded and communicated, but privacy is protected.

Under a second illustrated embodiment, blurring or masking is based upon face recognition. In this way, the privacy of all authorized users is protected even if each of the authorized users did not enter their respective PINs when entering the home.

This second illustrated embodiment operates similarly to the first embodiment and, in fact, may be used in conjunction with the first embodiment. Under the second embodiment, instead of simply recognizing the presence of an adult/adolescent, a face recognition processor identifies familiar (registered) faces based upon corresponding files of the familiar faces and uses this recognition to locally (and in real-time) decrease resolution or introduce masking of the faces or of whole bodies. Faces that are different and that cannot be recognized are detected by a face exception processor based upon a time limit for recognition. A record of non-recognized faces may be saved based upon time for later reference if a need later arises. Since this second embodiment protects all registered household faces, this embodiment doesn't need the geofence input in order to operate properly. It also provides a better method for monitoring non-registered adults/adolescents in the context where at least one household member is at home.

In another embodiment, the system is embodied as a stand-alone wireless camera wirelessly linked to a smartphone. Under this embodiment, the system has no sensors, alarms, etc. and is accessed and controlled by authorized persons (e.g., family members) via a smart phone application.

In general, the system incorporates the steps of a security camera of a security system within a residence capturing a sequence of images of a secured area of the residence, a programmed processor of the security system determining that an authorized person is present within the residence, a programmed processor detecting a detected person within the sequence of images, and a programmed processor blurring or reducing a picture quality of the detected person based upon a presence of the authorized person.

Alternatively, the system includes a security system that protects a secured area within a residence, a security camera of the security system, a programmed processor of the security system that determines that an authorized person is present within the residence, a programmed processor that captures a sequence of images of the secured area within the residence, a programmed processor that detects a detected person within the sequence of images and a programmed processor that blurs or reduces a picture quality of the detected person based upon a presence of the authorized person.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
   a security camera within a residence capturing a sequence of images of a secured area of the residence;
   a programmed processor of the security camera determining one of a presence of an authorized first person within the residence or an absence of the authorized first person from the residence;
   the programmed processor detecting a second person within the sequence of images;
   responsive to determining the presence of the authorized first person within the residence, the programmed processor blurring or reducing a picture quality of the authorized first person and the second person; and
   responsive to determining the absence of the authorized first person from the residence, the programed processor recording full fidelity picture quality from the security camera.

2. The method as in claim 1 wherein determining the presence of the authorized first person within the residence includes detecting entry of a personal identification number at an entry point of the residence.

3. The method as in claim 1 wherein determining the presence of the authorized first person within the residence includes detecting the authorized first person within the sequence of images.

4. The method as in claim 3 wherein the programmed processor identifies a human face within a first image of the sequence of images and compares the human face with a reference image of the authorized first person.

5. The method as in claim 1 further comprising determining that the second person is different than the authorized first person.

6. The method as in claim 5 further comprising capturing and saving a detailed image of the second person.

7. An apparatus comprising:
   a security camera of a security system within a residence that captures a sequence of images of a secured geographic area of the residence; and
   a programmed processor of the security system that determines one of a presence of an authorized first person within the residence or an absence of the authorized first person from the residence,
   wherein the programmed processor detects a second person within the sequence of images,
   wherein, responsive to determining the presence of the authorized first person within the residence, the programmed processor blurs or reduces a picture quality of the authorized first person and the second person within the sequence of images, and
   wherein, responsive to determining the absence of the authorized first person from the residence, the programed processor records full fidelity picture quality from the security camera.

8. The apparatus as in claim 7 wherein the programmed processor determining the presence of the authorized first person within the residence includes a user interface of the security system detecting an entry of a personal identification number at an entry point of the residence.

9. The apparatus as in claim 7 wherein the programmed processor determining the presence of the authorized first person within the residence includes the programmed processor detecting the authorized first person within the sequence of images.

10. The apparatus as in claim 9 wherein the programmed processor identifies a face within a first image of the sequence of images and compares the face with a reference image of the authorized first person.

11. The apparatus as in claim 7 wherein the programmed processor determines that the second person is different than the authorized first person.

12. The apparatus as in claim 11 wherein the programmed processor captures and saves a detailed image of the second person.

13. An apparatus comprising:
   a security system that protects a secured area within a residence;
   a security camera of the security system; and
   a programmed processor of the security system that determines one of a presence of an authorized first person within the residence or an absence of the authorized first person from the residence,
   wherein the programmed processor captures, from the security camera, a sequence of images of the secured area within the residence,
   wherein the programmed processor detects a second person within the sequence of images,
   wherein, responsive to determining the presence of the authorized first person within the residence, the programmed processor blurs or reduces a picture quality of the authorized first person and the second person within a field of view of the sequence of images, and
   wherein, responsive to determining the absence of the authorized first person from the residence, the programed processor records full fidelity picture quality from the security camera.

14. The apparatus as in claim 13 further comprising a user interface that detects entry of a personal identification number at an entry point of the residence.

15. The apparatus as in claim 13 wherein the programmed processor detects the authorized first person within the sequence of images.

16. The apparatus as in claim 15 further comprising a facial characteristics file used by the programmed processor to identify the authorized first person.

17. The apparatus as in claim 13 further comprising a file within a memory of the security system that saves the sequence of images.

* * * * *